United States Patent
Chiba

(10) Patent No.: US 9,988,077 B2
(45) Date of Patent: Jun. 5, 2018

(54) ELECTRIC POWER STEERING CONTROL DEVICE

(71) Applicant: MAZDA MOTOR CORPORATION, Hiroshima (JP)

(72) Inventor: Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 87 days.

(21) Appl. No.: 15/186,563

(22) Filed: Jun. 20, 2016

(65) Prior Publication Data
US 2017/0001660 A1 Jan. 5, 2017

(30) Foreign Application Priority Data
Jul. 3, 2015 (JP) .................................. 2015-134129

(51) Int. Cl.
*B62D 5/04* (2006.01)

(52) U.S. Cl.
CPC .................................. *B62D 5/0472* (2013.01)

(58) Field of Classification Search
CPC .................................................... B62D 5/0472
USPC ......................................................... 180/446
See application file for complete search history.

(56) References Cited

U.S. PATENT DOCUMENTS 8,626,394 B2 1/2014 Kezobo et al.
2016/0318548 A1* 11/2016 Tsubaki ............... B62D 5/0472

* cited by examiner

*Primary Examiner* — Anne Marie M Boehler
*Assistant Examiner* — Felicia L. Brittman
(74) *Attorney, Agent, or Firm* — Studebaker & Brackett PC

(57) ABSTRACT

Filters output a vibration-suppression gain for suppressing resonance of a sub frame or shimmy by performing a filter processing on a rotational angle of a motor. The filters have respective frequency characteristics that a gain becomes a maximum magnitude and a phase advances by 90° at a cut-off angle frequency. The cut-off angle frequency of the filter is fixedly set at a resonance frequency of the sub frame. The cut-off angle frequency of the filter is variably set in accordance with a tire rotation frequency. A gain adder adds the respective gains of the filters and outputs an added magnitude to a correcting mechanism as a vibration-suppression gain. The correcting mechanism corrects a motor torque set by an assist map by using the vibration-suppression gain outputted by the gain adder.

2 Claims, 15 Drawing Sheets

ELECTRIC POWER STEERING CONTROL DEVICE

BACKGROUND OF THE INVENTION

The present invention relates to a control device of an electric power steering which is installed in a vehicle, such as an automotive vehicle, and specifically relates to an electric power steering control device capable of suppressing both resonance of a vehicle-body member, such as a sub frame, and a vibration due to a rotation of a tire, such as shimmy.

The electric power steering installed in the vehicle, such as the automotive vehicle, comprises a motor to apply an assist torque to a steering device, a torque sensor to detect a steering torque applied by a driver, a vehicle speed sensor to detect a vehicle speed, and a control unit (ECU). The ECU sets a torque to be outputted by the motor (a motor torque) based on the steering torque detected by the torque sensor and the vehicle speed detected by the vehicle speed, and controls a current to be applied to the motor so as to provide the set motor torque (which is called an assist control).

Conventionally, the ECU simultaneously performs a vibration suppression control to suppress a vibration due to disturbance, such as sympathetic vibrations, in addition to the above-described assist control. The reason for this is that if the vibration suppression control is not performed, the above-described vibration is not only transmitted to driver's hands but a torque due to the above-described vibration is increased by the assist control.

U.S. Pat. No. 8,626,394 B2 discloses, as an example of the vibration suppression control, a device which comprises an assist map to output an assist torque current (a current to be applied to a motor) based on a steering torque applied by a driver, a vibration extracting filter to output a vibration component signal by decreasing a low-frequency side gain through performing filter processing on a rotational speed of the motor, a current variable gain map to calculate a current variable gain based on the current flowing through the motor, and a rotational-speed variable gain map to calculate a rotational-speed variable gain based on the rotational speed of the motor, thereby calculating a vibration suppression current based on the vibration component signal, the current variable gain, and the rotational speed variable gain, and then correcting the assist torque current by using the calculated vibration suppression current.

Meanwhile, there occurs the shimmy (tire shimmy) as one of vibrations experienced often during driving of the vehicle. The shimmy is the vibration due to an improper wheel balance and caused by a tire exchange, correction of the wheel balance, or the like. For example, when a vehicle travels at about 100-120 km/h (with a tire rotation frequency of about 10 Hz) on a highway, a steering wheel may vibrate slightly and quickly, which is the shimmy.

A vibration occurs inside a suspension device supported at a front sub frame due to the rotation of the tire, and this occurring vibration (the vibration due to the tire rotation) is transmitted to a steering wheel through a steering device including a tie rod, a pinion-rack mechanism, a steering shaft, and so on. The shimmy occurs accordingly. The suspension device comprises many kinds of members, each member of which has a natural frequency which is unique and different. Some of the above-described many kinds of members resonate with the rotation frequency of the tire and plural resonations of these members are combined and transmitted together, thereby generating the shimmy. Therefore, there are plural members resonating when the shimmy occurs, and thus it is not easy to find out the member which causes the shimmy.

Herein, since the shimmy occurs when the rotation frequency of the tire increases to a specified frequency and the vibrations of the plural members of the suspension device which resonate at this specified frequency are combined and transmitted to the driver's hands through the steering device, it is clear that the shimmy occurs when the vehicle speed increases up to a specified speed. Further, the rotation frequency of the tire where the shimmy occurs (a shimmy-occurrence frequency of 10 Hz in the above-described example) depends on vehicles which have individuality, different repair history, and the like, or aged deterioration of the suspension device, for example, of a vehicle itself. That is, the vehicle speed which causes the shimmy is unpredictable, so that it is necessary to have investigated this vehicle speed in advance.

The vibrations which occur due to the rotation of the tire described above include the one which is caused by deformation of a disc plate of a disc brake except the shimmy.

Further, in this case, if the natural frequency of the front sub frame of the vehicle-body member which supports the suspension device is within a range of the shimmy occurrence frequency (7-14 Hz, for example), when the tire rotation frequency increases up to the shimmy-occurrence frequency, the sub frame resonates with the tire rotation frequency. Since the sub frame is a large-sized and heavy member, the resonance of the sub frame is disturbance to be suppressed by the vibration suppression control. And, since the natural frequency of the sub frame does not change very greatly because of aged deterioration or the like, the tire rotation frequency with which the sub frame resonates (a sub-frame resonation frequency) is not changeable but steady. This kind of resonation of the vehicle-body member includes resonance of a side frame which is connected to the sub frame, resonance of a cross member which is connected to the side frame, and the like.

SUMMARY OF THE INVENTION

An object of the present invention is to provide an electric power steering control device which can properly suppress both the resonance of the vehicle-body member, such as the sub frame, and the vibration due to the tire rotation, such as the shimmy.

The present invention is an electric power steering control device, comprising a motor to apply an assist torque to a steering device, a torque detector to detect a steering torque applied by a driver, a setting mechanism to set a motor torque to be outputted to the motor based on the steering torque detected by the torque detector, a rotational angle detector to detect a rotational angle of the motor, a filter processor to output a vibration-suppression gain for suppressing resonance of a vehicle-body member and a vibration due to a tire rotation by performing a filter processing on the rotational angle of the motor detected by the rotational angle detector, and a correcting mechanism to correct the motor torque set by the setting mechanism by using the vibration-suppression gain outputted by the filter processor so as to suppress resonance of the vehicle-body member and the vibration due to the tire rotation, wherein the filter processor comprises a first filter which has a frequency characteristic that a gain becomes a specified magnitude and a phase advances by 90° at a cut-off angle frequency which is fixedly set at a resonance frequency of a specified vehicle-body member, a second filter which has another frequency characteristic that a gain becomes a specified magnitude and a phase advances by 90° at a cut-off angle frequency which is variably set in accordance with a tire rotation frequency which is changeable according to a vehicle speed, and a gain adder which adds the gain of the first filter and the gain of the second filter and outputs an added magnitude to the correcting mechanism as the vibration-suppression gain outputted by the filter processor.

According to the present invention, the gain of the first filter and the gain of the second filter are added and then outputted to the correcting mechanism.

In this case, since the cut-off angle frequency is fixed at the resonance frequency of the vehicle-body member in the first filter, the resonance of the vehicle-body member is always suppressed stably by the torque correction based on the vibration-suppression gain.

Meanwhile, since the cut-off angle frequency is variable in accordance with the tire rotation frequency in the second filter, even if the vibration due to the tire rotation (the shimmy, for example) has occurred at any frequency, this vibration is always suppressed by the correction based on the vibration-suppression gain. Accordingly, even if vehicles have different frequencies of the vibration due to the tire rotation depending on their individualities or the same vehicle experiences aged deterioration because of aged deterioration of its suspension device or the like, the vibration can be properly suppressed. Further, since it is unnecessary to know the frequency of the vibration due to the tire rotation in advance, suppressing of the vibration due to the tire rotation can be achieved easily.

Moreover, since the phase advances by 90° in any case, the correction of the motor torque by the correcting mechanism is executed with the phase being 90° shifted. Consequently, a viscosity is applied (viscosity application control), so that the resonance of the vehicle-body member and the vibration due to the tire rotation are suppressed surely and effectively by this viscosity.

In the present invention, it is preferable that the above-described filter processor further comprise weighting adjusters which weight the gain of the first filter and the gain of the second filter, respectively, before adding of the gain of the first filter and the gain of the second filter by the gain adder.

According to this structure, by weighting the gains of the first and second filters, the shift amount from the phase of 90° at the cut-off angle frequency is relatively small, compared with a case of no weighting. Accordingly, the viscosity application control is performed, so that the resonance of the vehicle-body member and the vibration due to the tire rotation are always suppressed surely and effectively by the viscosity.

Other features, aspects, and advantages of the present invention will become apparent from the following description which refers to the accompanying drawings.

DETAILED DESCRIPTION OF THE INVENTION

Figure 1:
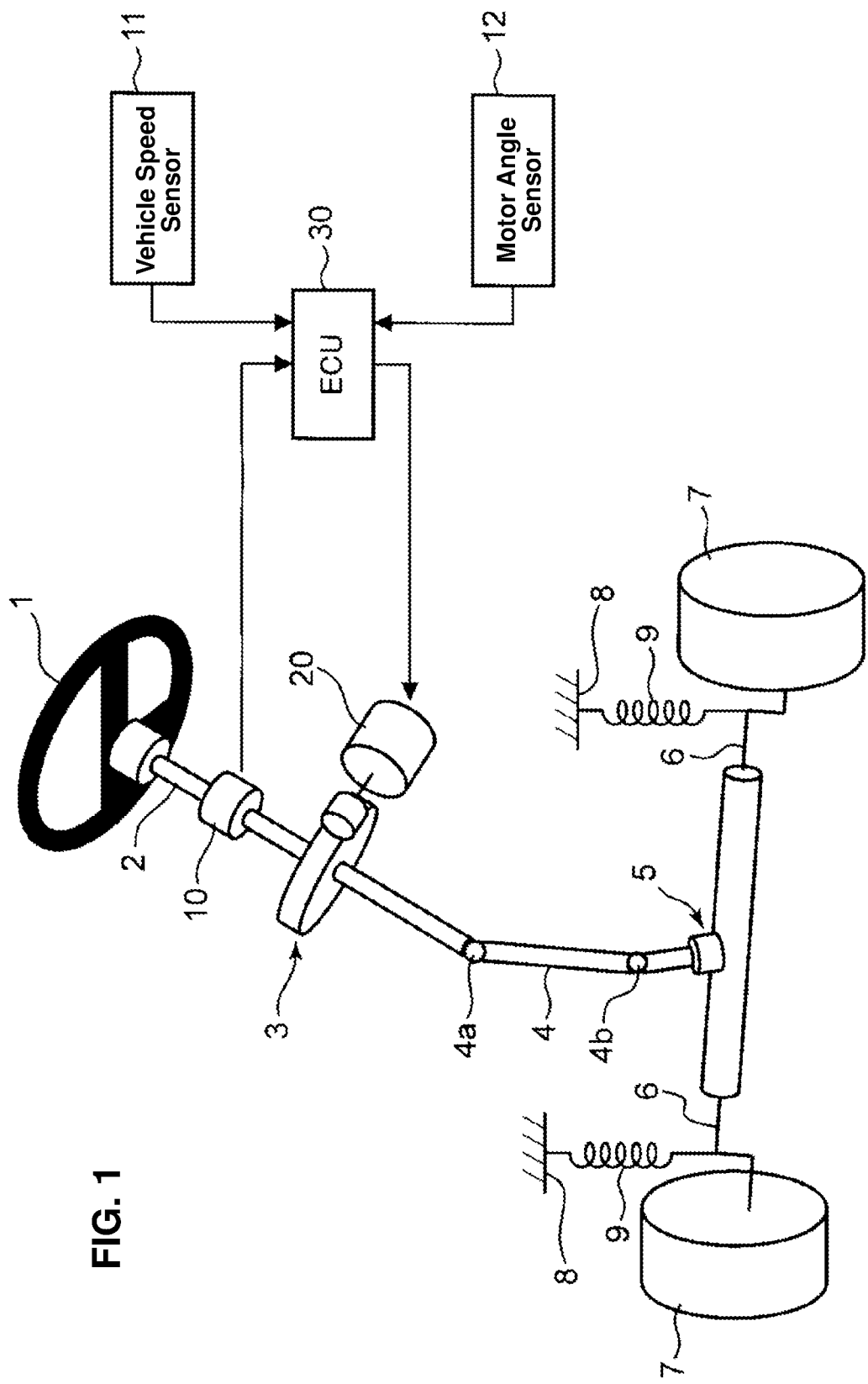
FIG. 1 is an entire structure of an electric power steering according to an embodiment of the present invention.

Hereafter, an embodiment of the present invention will be described referring to the drawings.

Figure 2:
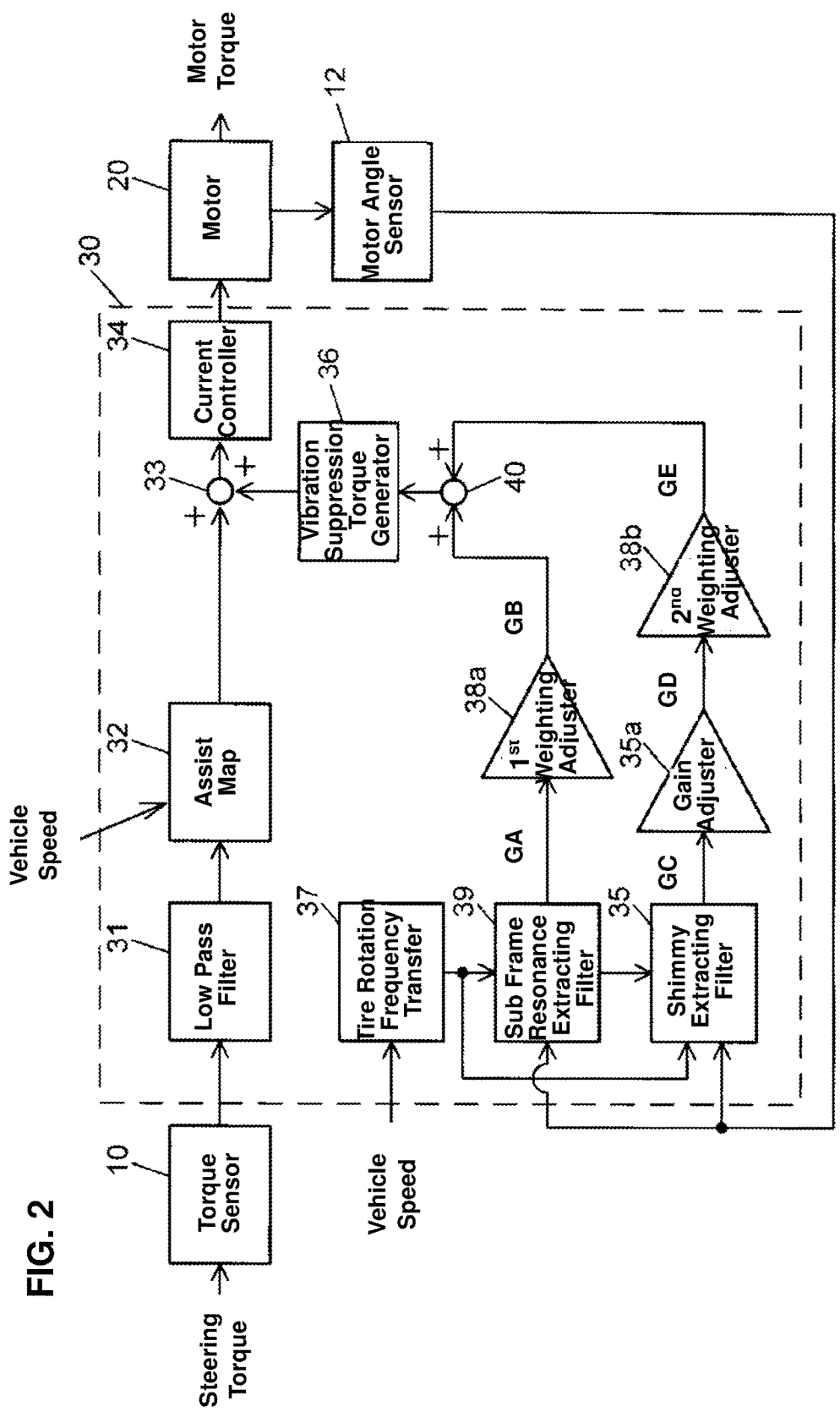
FIG. 2 is a block diagram of the electric power steering.

The present embodiment relates to an electric power steering control device capable of suppressing both resonance of a sub frame as a vehicle-body member and shimmy of a vibration due to a tire rotation as shown in FIGS. 1 and 2. A sub-frame resonance extracting filter 39 outputs a vibration-suppression gain for suppressing the resonance of a sub frame 8 (called a "sub-frame resonance-suppression gain") by performing filter processing on a rotational angle of a motor 20. A shimmy extracting filter 35 outputs a vibration-suppression gain for suppressing the shimmy (called a "shimmy-suppression gain") by performing the filter processing on the rotational angle of the motor 20. The filters 39, 35 have a frequency characteristic that the gain becomes a maximum magnitude and the phase advances by 90° at a cut-off angle frequency, respectively. The cut-off angle frequency of the filter 39 is fixedly set at a resonance frequency of the sub frame 8 as the vehicle-body member. The cut-off angle frequency of the filter 35 is variably set in accordance with the tire rotation frequency which is changeable according to a vehicle speed. A gain adder 40 adds both the gains of the filters 39, 35 and outputs this added magnitude to a correcting mechanism (comprising a vibration suppression torque generator 36 and an adder 33, which will be described later) as the vibration-suppression gain. The correcting mechanism (the vibration suppression torque generator 36, the adder 33) corrects a motor torque which is set at an assist map 32 by using the outputted vibration-suppression gain.

Specifically, as shown in FIG. 1, a vehicle (not illustrated) according to the present embodiment comprises a steering wheel 1, a steering shaft 2, an intermediate shaft 4 coupled via universal joints 4a, 4b provided at its both ends, a pinion rack mechanism 5, and a steering device to steer front wheels 7 through tie rods 6. Further, in this vehicle is installed a column assist type of electric power steering for applying an assist torque to the steering device, which comprises the motor 20 which is coupled to the steering shaft 2 via a speed reduction gear 3, a torque sensor (corresponding to a "torque detector" of the present invention) 10 to detect a steering torque applied by a driver, a vehicle speed sensor 11 to detect a vehicle speed, and an ECU (Electric Control Unit) 30.

In FIG. 1, the front sub frame 8 (corresponding to the "vehicle-body member" of the present invention) is a frame located at a lowermost position of a front portion of the vehicle and on which an engine (not illustrated) is mounted, and reference character 9 denotes a suspension device of the front wheels 7 which is supported at the front sub frame 8.

The ECU 30 is a microprocessor comprising CPU, ROM, RAM and others, and configured to set a motor torque to be outputted to the motor 20 based on the steering torque detected by the torque sensor 10 and the vehicle speed detected by the vehicle speed sensor 11 and control a current to be applied to the motor so as to provide the set motor torque (an assist control).

The electric power steering simultaneously performs a vibration suppression control to suppress resonance of the vehicle-body member, such as the sub frame 8, and a vibration due to a tire rotation, such as a vibration which is caused by shimmy or deformation of a disc plate of a disc brake. For this performance, it comprises a motor angle sensor (corresponding to a "rotational angle detector" of the present invention) 12 to detect a rotational angle of the motor 20. In the present embodiment, the resonance frequency of the sub frame 8 is 10 Hz (see FIG. 5).

Figure 3:
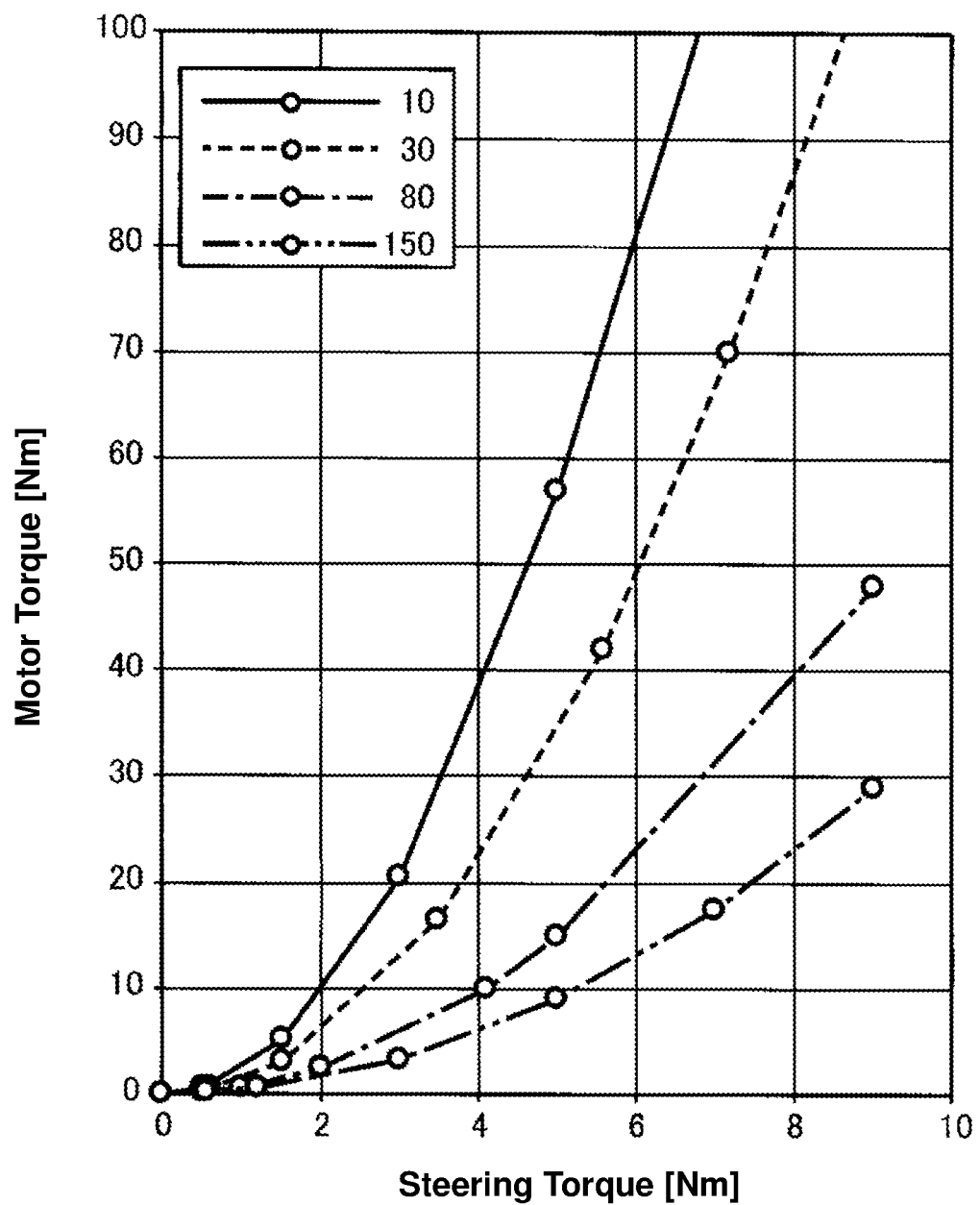
FIG. 3 is a graph showing an assist map in the above-described block diagram.
Figure 4:
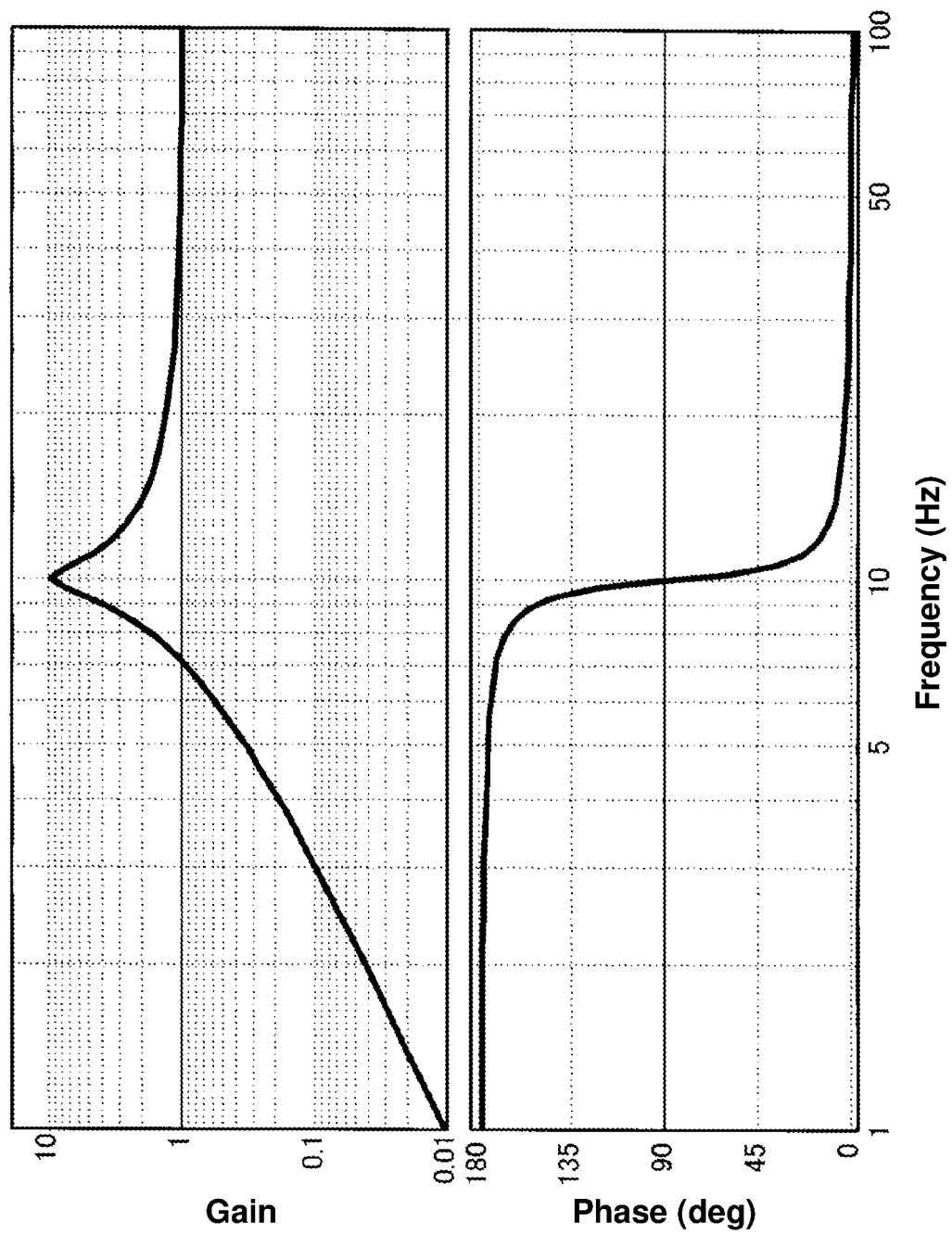
FIG. 4 is a bode diagram showing a frequency characteristic of filters in the above-described block diagram.

Hereafter, the above-described vibration suppression control according to the present embodiment will be described. FIG. 2 is a block diagram of the electric power steering, FIG. 3 is a graph showing an assist map 32 in the above-described block diagram, and FIG. 4 is a bode diagram showing a frequency characteristic of the filters 35, 39 in the above-described block diagram, which is a combination of a gain diagram and a phase diagram.

As shown in FIG. 2, the steering torque applied by the driver is detected by the torque sensor 10 and inputted to a low pass filter 31. A steering component signal on a low-frequency side, including a frequency of a driver's steering component (about 4-6 Hz), is extracted from the torque inputted to the low pass filter 31 and inputted to an assist map (corresponding to a "setting mechanism" of the present invention) 32. The assist map 32 shows input-output characteristics between the steering torque as an input and the motor torque as an output as shown in FIG. 3. The input-output characteristics are set in advance. Specifically, the abscissa of the graph represents the steering torque and the ordinate represents the motor torque. In an example of this graph, the respective input-output characteristics of the vehicle speeds of 10 km/h, 30 km/h, 80 km/h, and 150 km/h are set. The vehicle speed detected by the vehicle speed sensor 11 is inputted to the assist map 32. Herein, the greater the steering torque is or the lower the vehicle speed is, the greater the set motor torque is.

The motor torque set by the assist map 32 is corrected by an adder (corresponding to part of a "correcting mechanism" of the present invention) 33. Specifically, the motor torque set by the assist map 32 is inputted to the adder 33, where a vibration suppression torque which is generated at a vibration suppression torque generator (corresponding to part of the "correcting mechanism" of the present invention) 36, which will be described later, is added. The motor torque corrected by means of the vibration suppression torque generator 36 and the adder 33 is inputted to a current controller 34. The current controller 34 applies a current (a current of electricity) for providing this inputted motor torque to the motor 20. Thereby, the motor torque is increased (amplified) by the speed reduction gear 3 and then applied to the steering shaft 2. Thus, the assist control is performed.

The vibration suppression control which is performed simultaneously with the assist control starts with detecting the rotational angle of the motor 20 by means of the motor angle sensor 12 and inputting this detected rotational angle to the two filters 35, 39. Each of these filters 35, 39 is constituted by a well-known secondary bypass filter, which has the following frequency characteristics.

As shown in FIG. 4, the filters 35, 39 extract the input of a frequency band (7-30 Hz), including a cut-off angle frequency (an example in which this cut-off angle frequency is 10 Hz is shown in FIG. 4), on a high-frequency side which is higher than the frequency of the driver's steering component (4-6 Hz), and then outputs by multiplying a first gain having a magnitude larger than 1 and advancing a phase. In particular, at the cut-off angle frequency (10 Hz), the magnitude of the gain becomes a peak (10 in the illustrated example), so the first gain having the magnitude of 10 is outputted with the phase being 90° advanced.

The filters 35, 39 extract the input of the frequency band (30-100 Hz in the illustrated example) on the high-frequency side which is higher than the above-described frequency band (7-30 Hz), and then outputs by multiplying the second gain having the magnitude of about 1 and substantially not advancing the phase.

The filters 35, 39 extract the input of the frequency band (1-7 Hz in the illustrated example) on a low-frequency side which is lower than the above-described frequency band (7-30 Hz), and then outputs by multiplying a third gain having the magnitude smaller than 1 and advancing the phase.

The frequency characteristics of the filters 35, 39 can be approximately created (realized) by the following formula (a transfer-function formula of a secondary bypass filter).

$$s2/(s2+2\zeta\omega cs+\omega c2) \quad \text{Formula}$$

Herein, s is a Laplace operator, $\zeta$ is a damping coefficient, and ωc is the cut-off angle frequency.

The above-described frequency bands (1-7 Hz, 7-30 Hz, 30-100 Hz) can be easily set in various ranges by changing the above-described frequency characteristics of the filters 35, 39 of the secondary bypass filter with the above-described transfer-function formula. For example, any magnitude can be assigned as the cut-off angle frequency ωc which is one of parameters.

Figure 5:
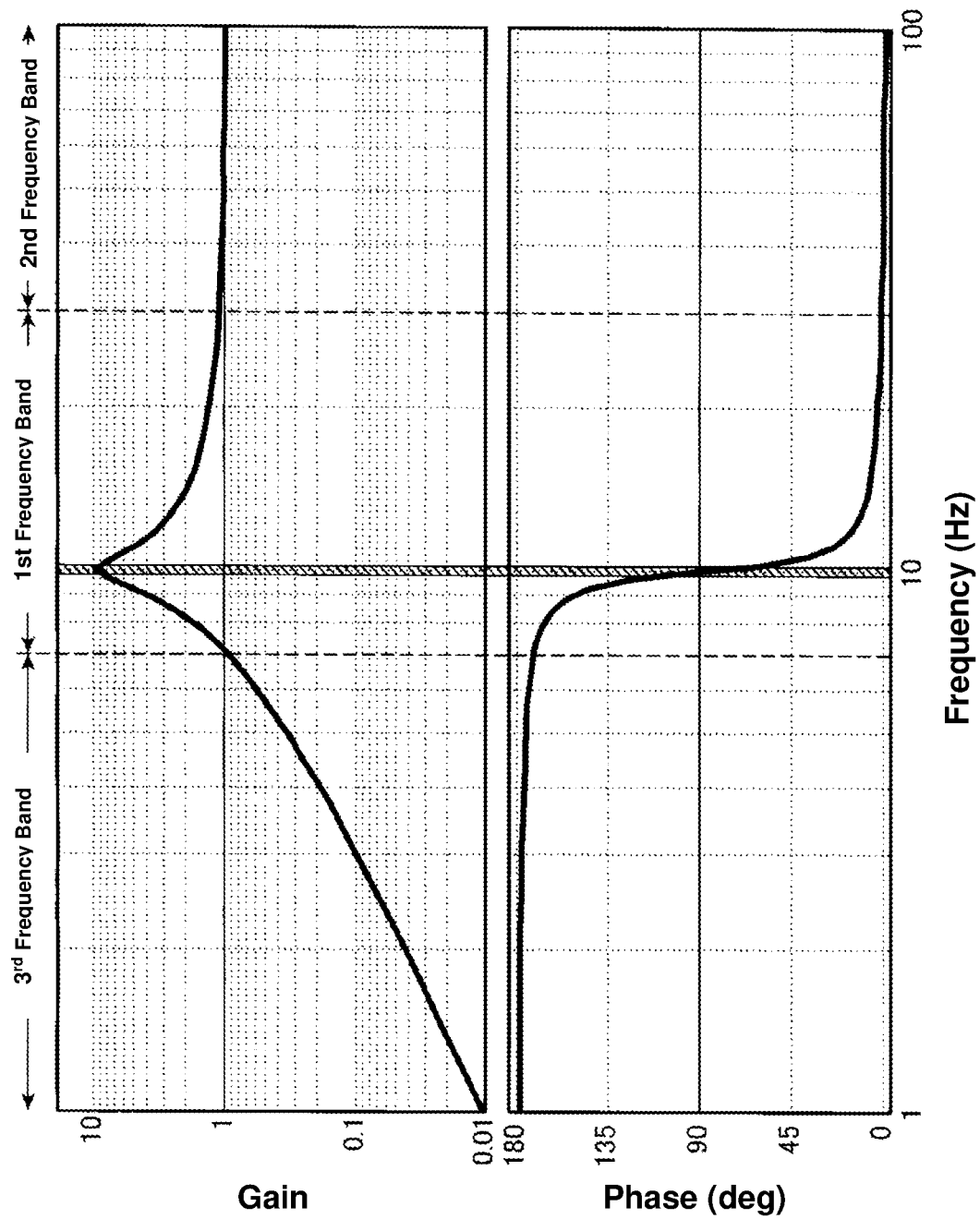
FIG. 5 is a bode diagram of a sub-frame resonance extracting filter in which a cut-off angle frequency is fixedly set at a sub-frame resonance frequency.

FIG. 5 is a bode diagram of the sub-frame resonance extracting filter (corresponding to a "first filter" of the present invention) 39 in which the cut-off angle frequency ωc is fixedly set at the resonance frequency of the sub frame 8 of the vehicle-body member (10 Hz in the present embodiment described above). That is, in the bode diagram shown in FIG. 4, the frequency band (7-30 Hz) where the first gain is outputted is set at a first frequency band, the frequency band (30-100 Hz) where the second gain is outputted is set at a second frequency band, and the frequency band (1-7 Hz) where the third gain is outputted is set at a third frequency band, respectively.

Returning to FIG. 2, the product (see reference character GA in the figure) of an extraction result of the sub-frame resonance extracting filter 39 and the gain is inputted to the gain adder 40 by way of the first weighting adjuster 38a as the vibration-suppression gain. A performance of the first weighting adjuster 38a will be described later.

Figure 6:
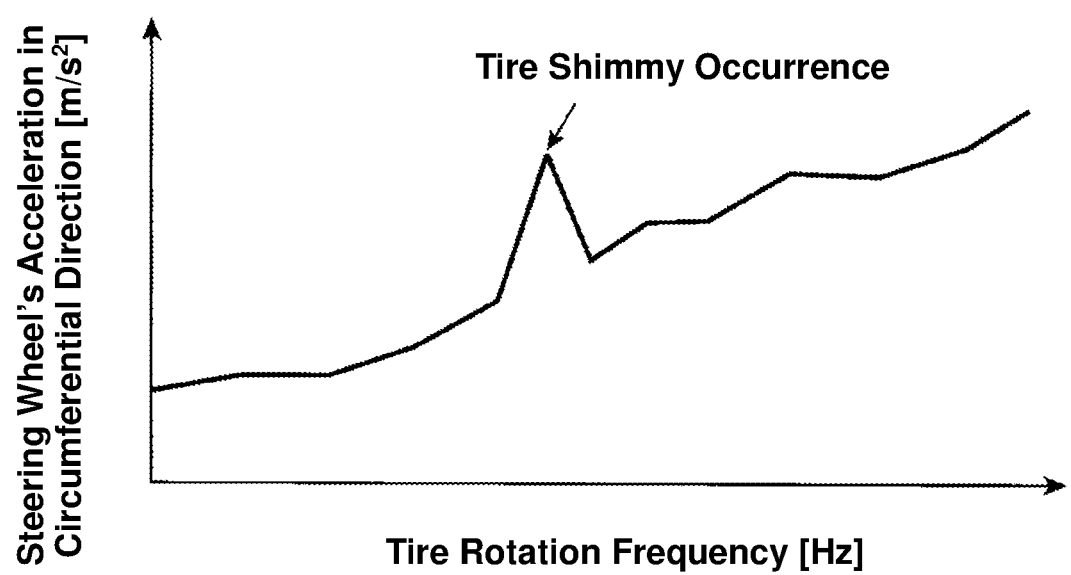
FIG. 6 is a graph showing a relation between a tire rotation frequency and an acceleration of a steering wheel in a circumferential direction, which is for explaining an occurrence of tire shimmy.

FIG. 6 is a graph showing a relation between a tire rotation frequency which corresponds to the vehicle speed and an acceleration of the steering wheel 1 in a circumferential direction which corresponds to a degree of vibration (vibration level), which is for explaining an occurrence of the shimmy (tire shimmy). The tire rotation frequency f (Hz) is determined from the vehicle speed V (km/h) and a tire radius (dynamic radius) R (m) by using the following conversion formula. For example, when V=110 and R=0.485, f=10.

$$f = V/(3.6 \times 2 \times \pi \times R) \qquad \text{Conversion Formula}$$

In the present embodiment, a tire rotation frequency convertor which is denoted by reference character 37 in FIG. 2 calculates the tire rotation frequency f based on the vehicle speed detected by the vehicle speed sensor 11 and then outputs to the sub-frame resonance extracting filter 39 of FIG. 5 and the shimmy extracting filter 35 of FIG. 7 which will be described next.

The shimmy is the vibration due to inferiority of the wheel balance and provides a phenomenon that the vibration due to the rotation of the tire causes the steering device or its surrounding members to resonate, so that the steering wheel 1 shakes (vibrates) slightly and quickly, for example. That is, a vibration force generated by the rotation of the tire causes a vibration which is generated inside the suspension device 9 supported at the sub frame 8 and this vibration is transmitted to the steering wheel 1 by way of the steering device which comprises the tie rod 6, the pinion rack mechanism 5, the intermediate shaft 4, and the steering shaft 2, and others. This is the shimmy. The shimmy occurs when the tire rotation frequency increases up to a shimmy occurrence frequency (corresponding to a tire rotation frequency when the shimmy occurs) which is a resonance point. Herein, the shimmy occurrence frequency depends on vehicles which have individuality, different repair history, and the like. Also, the shimmy occurrence frequency depends on aged deterioration of the suspension device 9, for example, of a vehicle itself.

Figure 7:
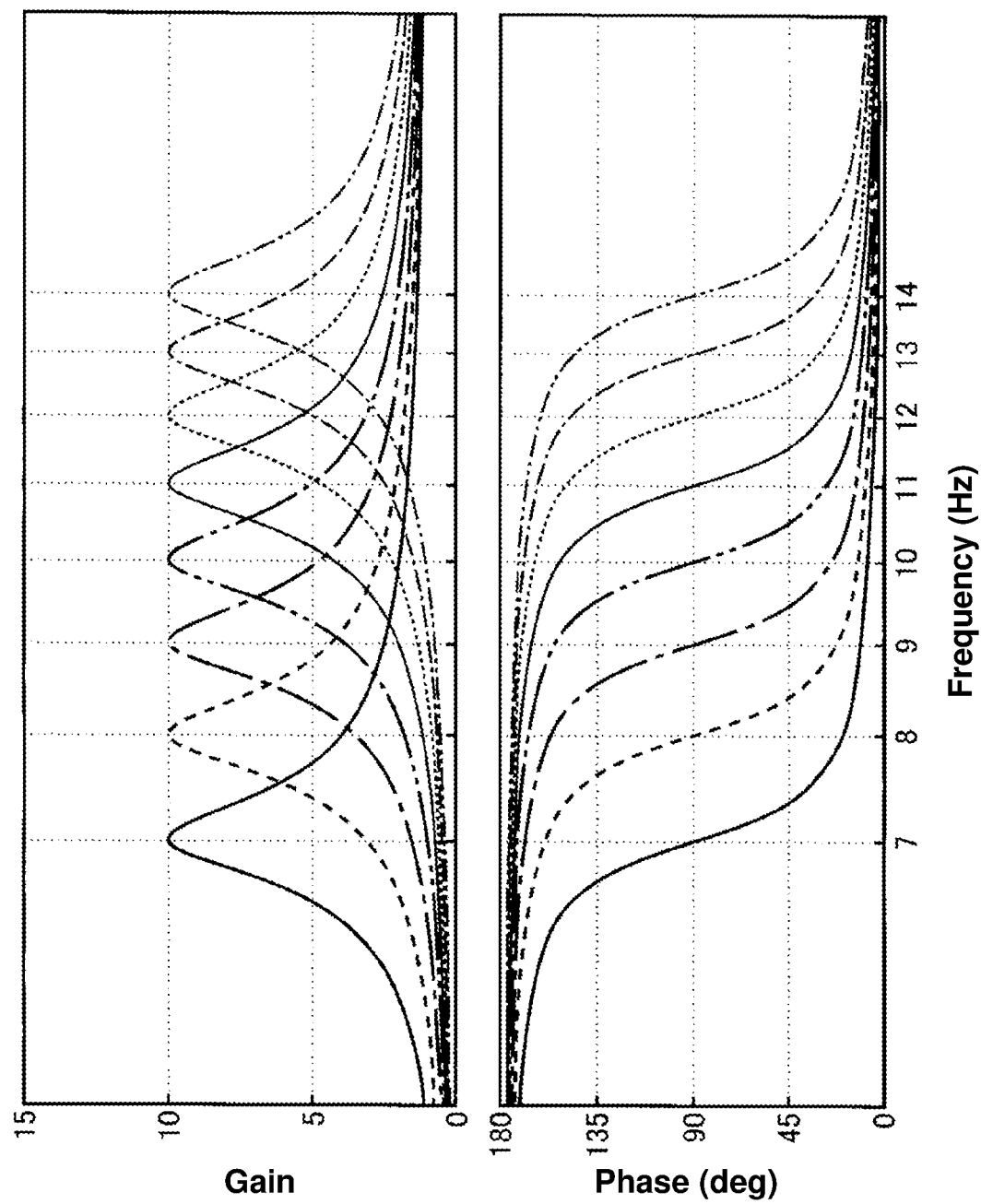
FIG. 7 is a bode diagram of a shimmy extracting filter in which a cut-off angle frequency is variably set in accordance with the tire rotation frequency which is changeable according to a vehicle speed.

FIG. 7 is a bode diagram of the shimmy extracting filter 35 (corresponding to a "second filter" of the present invention) in which the cut-off angle frequency ωc is variably set in accordance with the tire rotation frequency which is changeable according to the vehicle speed. That is, the cut-off angle frequency which is set at 10 Hz is variably set at the plural tire rotation frequencies (7, 8, 9, 10, 11, 12, 13 and 14 Hz in the illustrated example) in the bode diagram of FIG. 4. In other words, the cut-off angle frequency ωc of the frequency characteristic shown in FIG. 4 is changeably adjusted at the different tire rotation frequency. Herein, in FIG. 7, the ordinate of the gain diagram does not provide a logarithmic display (the frequency characteristics of FIG. 7 is the same as that of FIG. 4), which is different from FIG. 4.

Specifically, while the cut-off angle frequency ωc is set at 10 Hz in the bode diagram of FIG. 4, that is set at 7, 8, 9, 10, 11, 12, 13 and 14 Hz in the bode diagram of FIG. 7. The tire rotation frequency convertor 37 converts a current vehicle speed V (km/h) to the tire rotation frequency f (Hz) according to the above-described conversion formula, and outputs to the shimmy extracting filter 35. The gain adjuster 35a shown in FIG. 2 assigns the obtained magnitude (the current tire rotation frequency) as the cut-off angle frequency ωc of the above-described conversion formula. Thereby, the shimmy which occurs at the current vehicle speed is suppressed by the vibration suppression torque based on the vibration-suppression gain (see the gain diagram of FIG. 7). In this case, it does not matter whether or not the shimmy actually occurs at the current vehicle speed. That is, by setting the tire rotation frequency f (Hz) corresponding to the current vehicle speed V (km/h) as the cut-off angle frequency ωc, it becomes unnecessary that the shimmy occurrence frequency has been investigated in advance, and if the shimmy occurs, the occurring shimmy can be always suppressed. Accordingly, even if the vehicles have different shimmy occurrence frequencies depending on their individualities, repair histories, and the like, or the vehicle itself experiences aged deterioration of the suspension device 9, for example, the shimmy can be properly suppressed. That is, it is unnecessary to know the unpredictable shimmy occurrence frequency or to conduct an investigation to know in advance, and the suppression of the shimmy becomes possible always in such situations.

Returning to FIG. 2, the product (see reference character GC in the figure) of an extraction result of the vibration extracting filter 35 and the gain is inputted to the above-described gain adder 40 by way of the gain adjuster 35a and a second weighting adjuster 38b as the vibration-suppression gain. A performance of the second weighting adjuster 38b will be described later.

Figure 8:
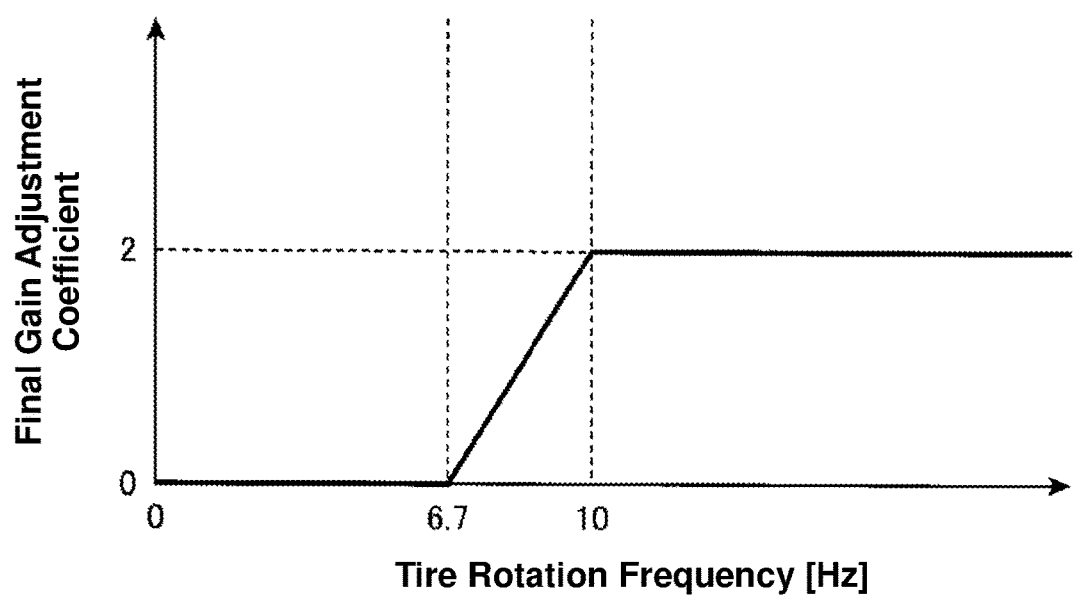
FIG. 8 is a graph showing a performance of a gain adjuster in the above-described block diagram.

Before the performance of the first weighting adjuster 38a which is positioned on a signal route from the sub-frame resonance extracting filter 39 to the gain adder 40 and the performance of the second weighting adjuster 38b which is positioned on a signal route from the shimmy extracting filter 35 to the gain adder 40 are described, a performance of the gain adjuster 35a positioned before the second weighting adjuster 38b will be described first. That is, FIG. 8 is a graph showing the performance of the gain adjuster 35a. The gain adjuster 35a reads out a final gain adjustment coefficient from the graph of FIG. 8 in accordance with the tire rotation frequency f and multiplies the read-out coefficient by the product of the extraction result of the vibration extracting filter 35 and the gain adjusted, in addition to assigning the current tire rotation frequency f as the cut-off angle frequency ωc of the conversion formula as described above.

In the example shown in FIG. 8, since the final gain adjustment coefficient is zero in a range of the tire rotation frequency being 0 Hz or greater and lower than 6.7 Hz, the vibration-suppression gain having the magnitude of zero (see reference character GD of FIG. 2) is inputted to the second weighting adjuster 38b from the gain adjuster 35a regardless of the magnitude of the product (see reference character GC in the figure) of the extraction result of the vibration extracting filter 35 and the gain. Further, since the final gain adjustment coefficient is 2 in a range of the tire rotation frequency being 10 Hz or greater, the vibration-suppression gain having the magnitude which is double of the product of the extraction result of the vibration extracting filter 35 and the gain is inputted to the second weighting adjuster 38b from the gain adjuster 35a. Moreover, since the final gain adjustment coefficient becomes greater as the tire rotation frequency is higher in a range of the tire rotation frequency being 6.7 Hz or higher and lower than 10 Hz, the vibration-suppression gain having the magnitude which becomes greater as the tire rotation frequency is higher is inputted to the second weighting adjuster 38b from the gain adjuster 35a.

Accordingly, in a case in which the cut-off angle frequency is set at 10, 11, 12, 13 and 14 Hz in FIG. 7, for example, the peak of the gain becomes 20. In a case in which the cut-off angle frequency is set at 7, 8 and 9 Hz, the peak of the gain becomes smaller than 20 as the cut-off angle frequency is smaller.

Figure 9:
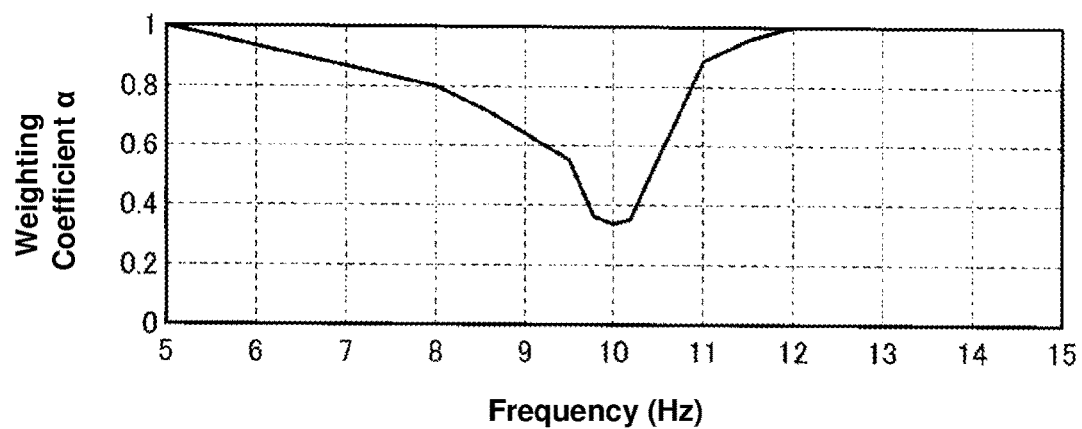
FIG. 9 is a graph of a weighting coefficient α which a first weighting adjuster in the above-described block diagram uses.
Figure 10:
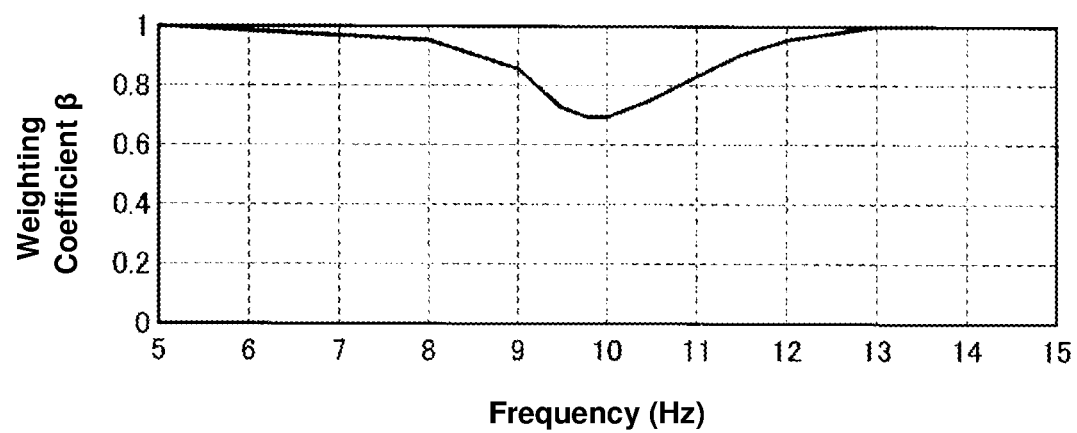
FIG. 10 is a graph of a weighting coefficient β which a second weighting adjuster in the above-described block diagram uses.

Next, the performance of the first weighting adjuster 38a and the performance of the second weighting adjuster 38b will be described. That is, FIG. 9 is a graph of a first weighting coefficient α which the first weighting adjuster 38a uses, and FIG. 10 is a graph of a second weighting coefficient β which the second weighting adjuster 38b uses. The first weighting adjuster 38a reads out the first weighting coefficient α from the graph of FIG. 9 in accordance with the frequency and further multiplies the read-out coefficient α by the product of the extraction result of the sub-frame resonance extracting filter 39 and the gain. The second weighting adjuster 38b reads out the second weighting coefficient β from the graph of FIG. 10 in accordance with the frequency and further multiplies the read-out coefficient β by the vibration-suppression gain inputted from the gain adjuster 35a.

In the illustrated example of FIG. 9, since the first weighting coefficient α is 1 in a range of the frequency which is lower than 5 Hz or higher than 12 Hz, the vibration-suppression gain which has the same magnitude as the product of the extraction result of the sub-frame resonance extracting filter 39 and the gain (see the reference character GA of FIG. 2) which is inputted from the sub-frame resonance extracting filter 39 to the first weighting adjuster 38a, that is—the sub-frame resonance-suppression gain (see reference character GB in FIG. 2) is inputted to the gain adder 40 from the first weighting adjuster 38a. Further, in a range of the frequency which is 5 Hz or higher and 10 Hz or lower, since the first weighting coefficient α becomes smaller than 1 as the frequency becomes higher, the sub-frame resonance-suppression gain which has the magnitude which becomes smaller than the product of the extraction result of the sub-frame resonance extracting filter 39 and the gain as the frequency becomes higher is inputted to the gain adder 40 from the first weighting adjuster 38a. Moreover, in a range of the frequency which is higher than 10 Hz and 12 Hz or lower, since the first weighting coefficient α becomes greater than a maximum magnitude 0.35 as the frequency becomes higher, the sub-frame resonance-suppression gain which has the magnitude which becomes greater as the frequency becomes higher is inputted to the gain adder 40 from the first weighting adjuster 38a.

Thus, in FIG. 5 for example, the peak of the gain when the frequency is 10 Hz becomes smaller than 10 (specifically, since the minimum magnitude of the first weighting coefficient α is 0.35, the peak of the gain becomes 3.5).

According to the illustrated example of FIG. 10, since the second weighting coefficient β is 1 in a range of the frequency which is lower than 5 Hz or higher than 13 Hz, the vibration-suppression gain which has the same magnitude as the vibration-suppression gain which is inputted to the second weighting adjuster 38b from the gain adjuster 35a (see reference character GD of FIG. 2), that is—the shimmy-suppression gain (see reference character GE in FIG. 2) is inputted to the gain adder 40 from the first weighting adjuster 38a. Further, in a range of the frequency which is 5 Hz or higher and 10 Hz or lower, since the second weighting coefficient β becomes smaller than 1 as the frequency becomes higher, the shimmy-suppression gain which has the magnitude which becomes smaller than the vibration-suppression gain which is inputted to the second weighting adjuster 38b from the gain adjuster 35a as the frequency increases becomes higher is inputted to the gain adder 40 from the second weighting adjuster 38b. Moreover, in a range of the frequency which is higher than 10 Hz and 13 Hz or lower, since the second weighting coefficient β becomes greater than a minimum magnitude 0.7 as the frequency becomes higher, the shimmy-suppression gain which has the magnitude which becomes greater as the frequency becomes higher is inputted to the gain adder 40 from the second weighting adjuster 38b.

Thus, in FIG. 7 for example, the peak of the gain when the cut-off angle frequency is set at 10 Hz becomes smaller than 20 (20 is the magnitude after the performance of FIG. 8 by the gain adjuster 35a is executed) (specifically, since the minimum magnitude of the second weighting coefficient β is 0.7, the peak of the gain becomes 14).

Returning to FIG. 2, the gain adder 40 adds the vibration-suppression gain inputted from the first weighting adjuster 38a through the sub-frame resonance extracting filter 39, i.e., the sub-frame resonance-suppression gain, and the vibration-suppression gain inputted from the second weighting adjuster 38b through the shimmy extracting filter 35, i.e., the shimmy-suppression gain. The gain adder 40 outputs an added magnitude to the vibration-suppression torque generator 36 as the vibration-suppression gain.

Herein, the shimmy extracting filter 35, the gain adjuster 35a, the first weighting adjuster 38a, the second weighting adjuster 38b, the sub-frame resonance extracting filter 39, and the gain adder 40 correspond to a "filter processor" of the present invention or are elements to constitute the "filter processor" of the present invention.

Figure 11:
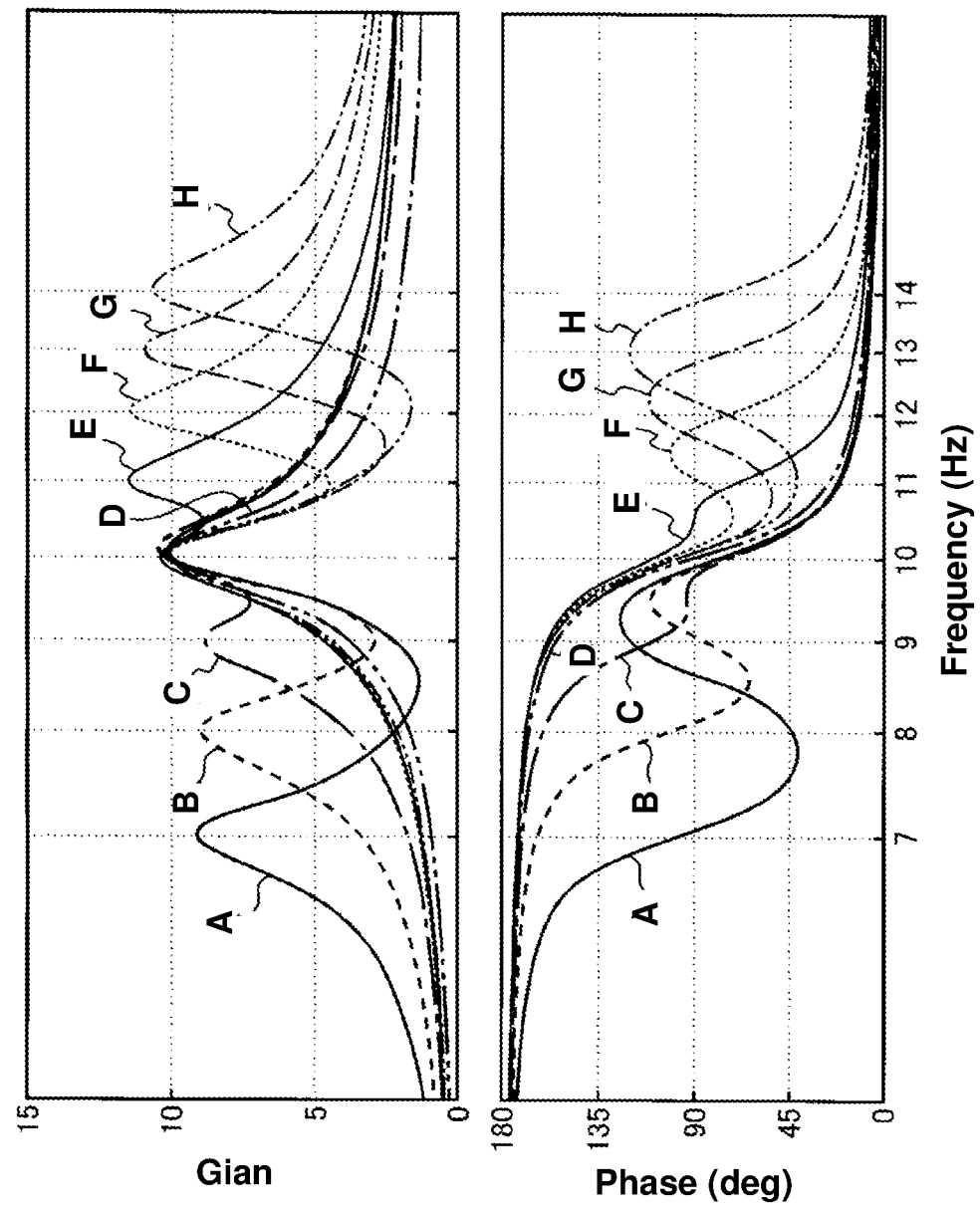
FIG. 11 is a bode diagram of a case in which a gain adder in the above-described block diagram weighting-adds a vibration-suppression gain inputted from the first weighting adjuster and a vibration-suppression gain inputted from the second weighting adjuster (a case in which the above-described weighting coefficients α, β change according to the frequency as shown in FIGS. 9 and 10).

FIG. 11 is a bode diagram which is obtained in a case in which the gain adder 40 weighting-adds the sub-frame resonance-suppression gain inputted from the first weighting adjuster 38a and the shimmy-suppression gain inputted from the second weighting adjuster 38b, that is, in a case in which the above-described weighting coefficients α, β are changed according to the frequency as shown in FIGS. 9 and 10.

In FIG. 11, a waveform A, for example, is a waveform which is obtained by adding (weighting adding) the sub-frame resonance-suppression gain (see the reference character GB of FIG. 2) which is obtained by multiplying the frequency characteristic (see the reference character GA of FIG. 2) of the sub-frame resonance extracting filter 39 of FIG. 5 in which the cut-off angle frequency ωc is fixedly set at the sub-frame resonance frequency 10 Hz by the first weighting coefficient α of FIG. 9 and the shimmy-suppression gain (see the reference character GE of FIG. 2) which is obtained by multiplying the frequency characteristic (see the reference character GC of FIG. 2) of the shimmy extracting filter 35 of FIG. 7 in which the cut-off angle frequency ωc is variably set in accordance with the tire rotation frequency 7 Hz which is changeable according to the vehicle speed by the final gain adjustment coefficient of FIG. 8 and then further by the second weighting coefficient β of FIG. 10. Other waveforms B-H are the same as the waveform A except a point that the tire rotation frequency is variably set at 8, 9, 10, 11, 12, 13 and 14 Hz.

In the gain diagrams, each waveform has two peaks of a peak derived from the resonance frequency of the sub frame 8 and another peak derived from the tire rotation frequency, except the waveform D in which the cut-off angle frequency ωc of the sub-frame resonance extracting filter 39 and the cut-off angle frequency ωc of the shimmy extracting filter 35 are both 10 Hz.

Meanwhile, in the phase diagrams, each waveform has a characteristic in which a phase of the peak which is derived from the resonance frequency of the sub frame 8 and another phase of the peak which is derived from the tire rotation frequency are both shifted from 90°, except the above-described waveform D.

Figure 13:
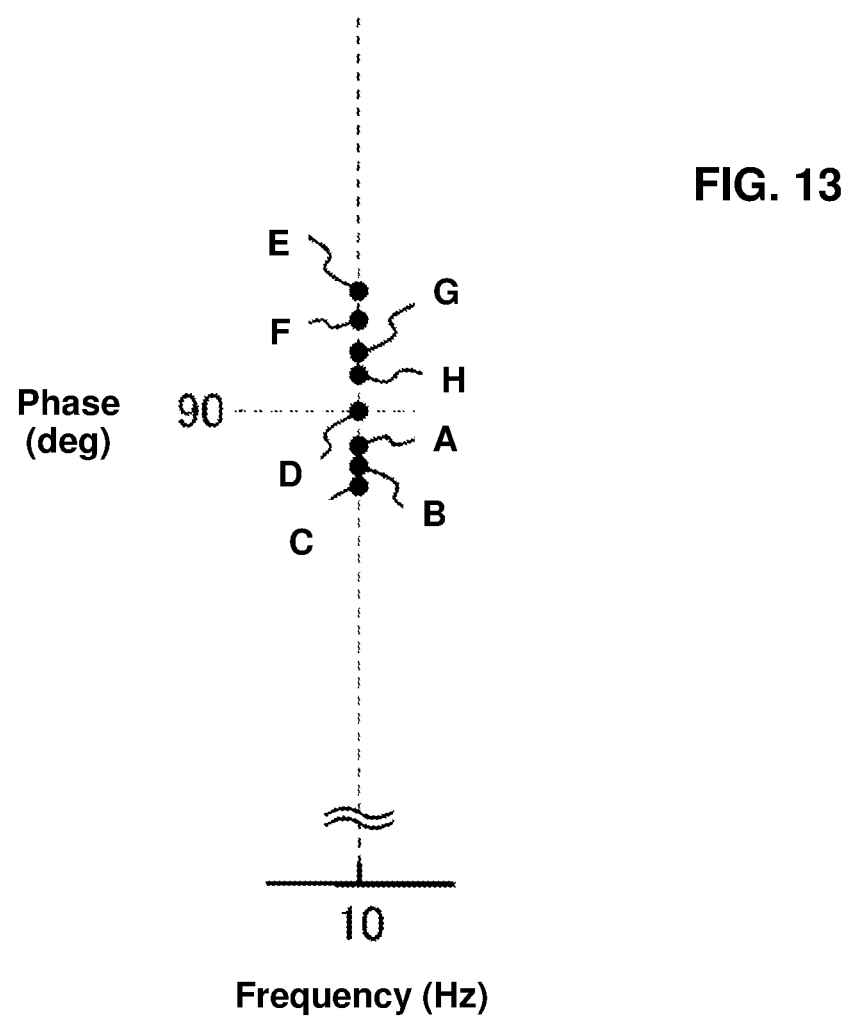
FIG. 13 is a diagram enlarging and showing a shift amount from a phase of 90° at the sub-frame resonance frequency in the case of the weighting addition of FIG. 11.

FIG. 13 is a diagram enlarging and showing a shift amount of the above-described waveforms A-H from the phase of 90° at the sub-frame resonance frequency (10 Hz) in the case of the weighting addition of FIG. 11. As shown, in the waveform D of the case in which the cut-off angle frequency ωc of the sub-frame resonance extracting filter 39 and the cut-off angle frequency ωc of the shimmy extracting filter 35 match at 10 Hz, the phase is not shifted from 90°. Meanwhile, in a case in which the cut-off angle frequency ωc of the sub-frame resonance extracting filter 39 and the cut-off angle frequency ωc of the shimmy extracting filter 35 are different from each other, the smaller the difference between them is, the larger the shift amount of the phase from 90° is (the waveforms A<B<C, the waveforms E>F>G>H). Herein, the shift amounts of the phases of the waveforms A-H at the tire rotation frequency have a similar trend, which is not enlarged and shown.

Figure 12:
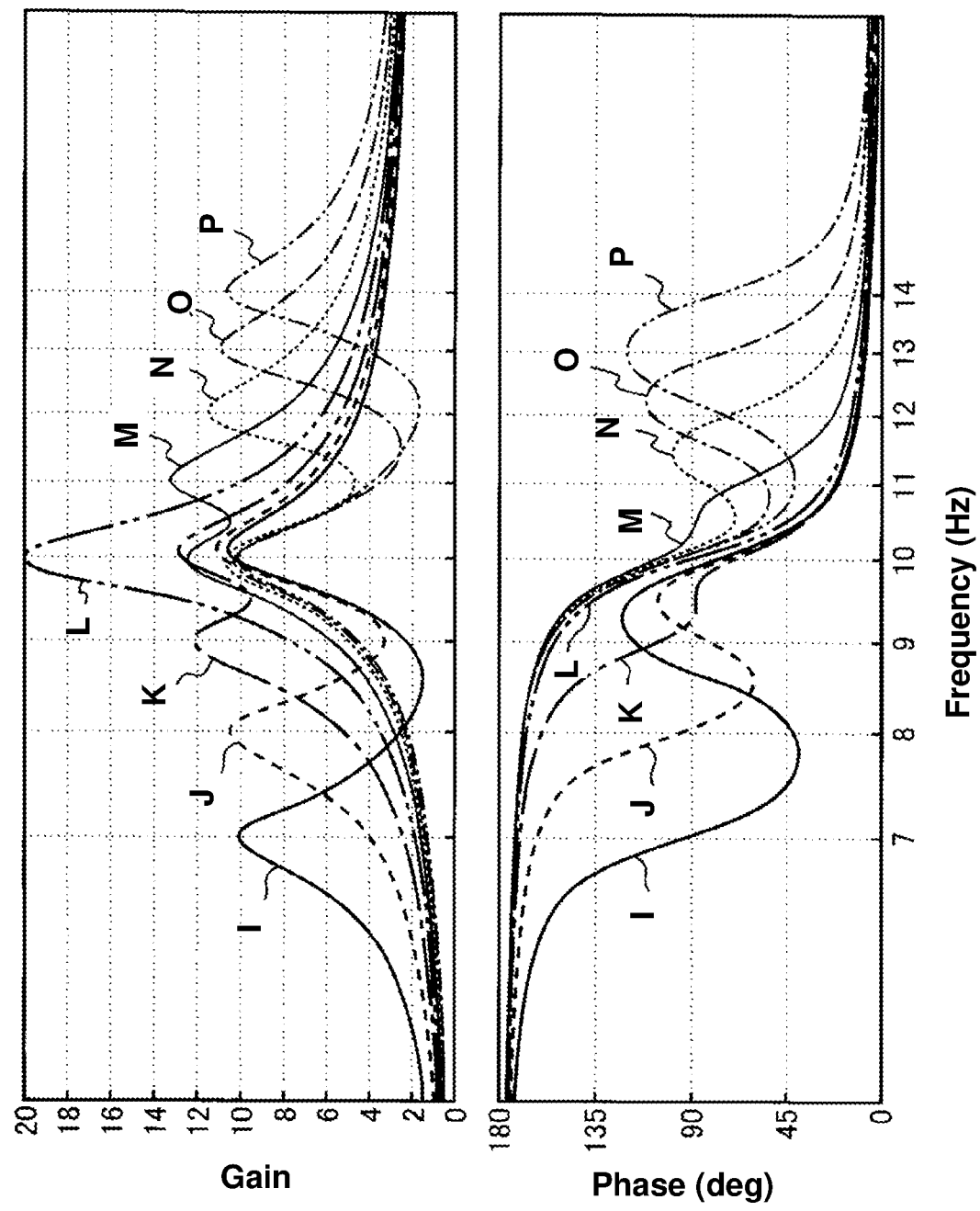
FIG. 12 is a bode diagram of a case in which the gain adder simply adds the vibration-suppression gain inputted from the first weighting adjuster and the vibration-suppression gain inputted from the second weighting adjuster (a case in which the above-described weighting coefficients α, β are always 1 regardless of the frequency).

Meanwhile, FIG. 12, which shows a comparative example, which is a bode diagram of a case in which the gain adder 40 simply adds the sub-frame resonance-suppression gain inputted from the first weighting adjuster 38a and the shimmy suppression gain inputted from the second weighting adjuster 38b, that is—a case in which the above-described weighting coefficients α, β are always 1 regardless of the frequency.

In FIG. 12, a waveform I, for example, is a waveform which is obtained by adding (weighting adding) the sub-frame resonance-suppression gain (see the reference character GB of FIG. 2) which is obtained by multiplying the frequency characteristic (see the reference character GA of FIG. 2) of the sub-frame resonance extracting filter 39 of FIG. 5 in which the cut-off angle frequency ωc is fixedly set at the sub-frame resonance frequency 10 Hz by the coefficient 1 and the shimmy suppression gain (see the reference character GE of FIG. 2) which is obtained by multiplying the frequency characteristic (see the reference character GC of FIG. 2) of the shimmy extracting filter 35 of FIG. 7 in which the cut-off angle frequency ωc is variably set in accordance with the tire rotation frequency 7 Hz which is changeable according to the vehicle speed by the final gain adjustment coefficient of FIG. 8 and then further by the coefficient 1. Other waveforms J-P are the same as the waveform I except the point that the tire rotation frequency is variably set at 8, 9, 10, 11, 12, 13 and 14 Hz.

In the gain diagrams, each waveform has two peaks of a peak derived from the resonance frequency of the sub frame 8 and another peak derived from the tire rotation frequency, except the waveform L in which the cut-off angle frequency ωc of the sub-frame resonance extracting filter 39 and the cut-off angle frequency ωc of the shimmy extracting filter 35 are both 10 Hz.

In comparison of FIG. 11 and FIG. 12, the peak of the waveform D of FIG. 11 at 10 Hz is about 10, whereas the peak of the waveform L of FIG. 12 at 10 Hz is 20. This is because the first weighting coefficient α is 0.35 and the second weighting coefficient β is 0.7 in FIG. 11, whereas the weighting coefficients α, β are always 1 regardless of the frequency in FIG. 12.

Meanwhile, in the phase diagrams, each waveform has a characteristic in which a phase of the peak which is derived from the resonance frequency of the sub frame 8 and another phase of the peak which is derived from the tire rotation frequency are both shifted from 90°, except the above-described waveform L.

Figure 14:
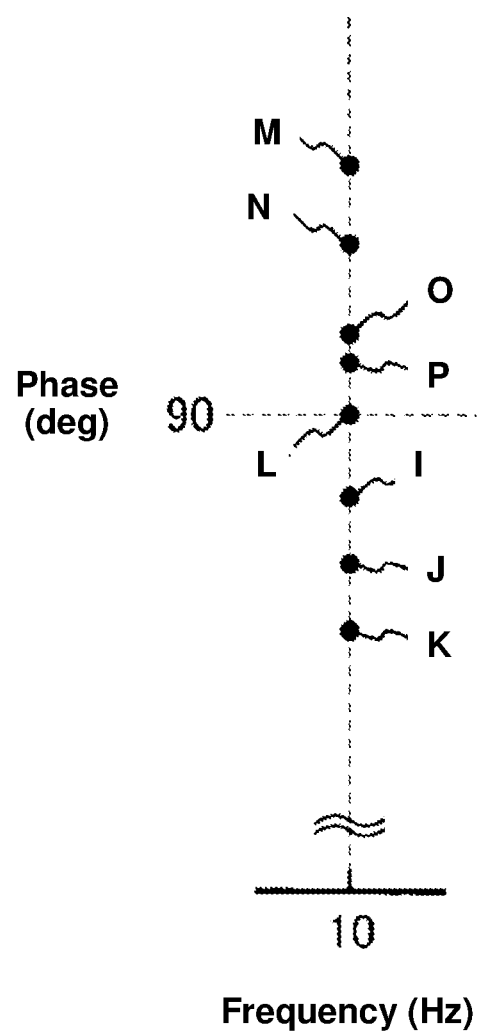
FIG. 14 is a diagram enlarging and showing a shift amount from a phase of 90° at the sub-frame resonance frequency in the case of the simple addition of FIG. 12.

FIG. 14 is a diagram enlarging and showing the shift amount of the above-described waveforms I-P from the phase of 90° at the sub-frame resonance frequency (10 Hz) in the case of the simple addition of FIG. 12. As shown, in the waveform L of the case in which the cut-off angle frequency ωc of the sub-frame resonance extracting filter 39 and the cut-off angle frequency ωc of the shimmy extracting filter 35 match at 10 Hz, the phase is not shifted from 90°. Meanwhile, in a case in which the cut-off angle frequency ωc of the sub-frame resonance extracting filter 39 and the cut-off angle frequency ωc of the shimmy extracting filter 35 are different from each other, the smaller the difference between them is, the larger the shift amount of the phase from 90° is (the waveforms I<J<K, the waveforms M>N>O>P). Herein, the shift amounts of the phases of the waveforms I-P at the tire rotation frequency have a similar trend, which is not enlarged and shown.

Herein, in comparison of FIG. 13 to FIG. 14, the shift amount from the phase of 90° at the sub-frame resonance frequency (10 Hz) increases in the case of the simple addition of FIG. 14, compared to the case of the weighting addition of FIG. 13. This is not good to the viscosity application control, which will be described. In other words, the viscosity application control is improved by the weighting addition.

Returning to FIG. 2, the vibration suppression torque generator 36 generates the vibration suppression torque based on the inputted vibration-suppression gain. Specifically, the vibration suppression torque is generated in such a manner that the greater the vibration-suppression gain is, the greater the vibration suppression torque is. In particular, when the vibration-suppression gain is zero, the vibration suppression torque becomes zero. Further, the vibration suppression becomes the peak at the cut-off angle frequency ωc where the vibration-suppression gain is the peak (maximum magnitude).

The vibration suppression torque generated by the vibration suppression torque generator 36 is inputted to the above-described adder 33, where the vibration suppression torque by the vibration suppression torque generator 36 is added to the motor torque set by the assist map 32 (that is, which is used for correcting the motor torque). In other words, the vibration suppression torque generator 36 and the adder 33 jointly corrects the motor torque set by the assist map 32 by using the shimmy-suppression gain which is outputted by the shimmy extracting filter 35 and the gain adjuster 35a and the sub-frame resonance-suppression gain which is outputted by the sub-frame resonance extracting filter 39 so as to suppress the resonance of the vehicle-body member, i.e., the sub frame 8, and the vibration due to the tire rotation, i.e., the shimmy.

Specifically, the smaller the vibration-suppression gain is, the smaller the vibration suppression torque generated by the vibration suppression torque generator 36 is, and therefore the correction of the motor torque is slight. In particular, when the vibration-suppression gain is zero, the vibration suppression torque becomes zero, and therefore the motor torque is not corrected at all. Consequently, the assist control for assisting the driver's steering is properly performed, without being influenced by the vibration suppression control. Accordingly, the assist control follows the steering torque applied by the driver with excellent responsiveness, thereby providing appropriate steering feeling.

To the contrary, the greater the vibration-suppression gain is, the greater the vibration suppression torque generated by the vibration suppression torque generator 36 is, and therefore the motor torque is greatly corrected so as to suppress the sub-frame resonance and/or the shimmy. In particular, since the vibration suppression torque becomes the peak (a maximum magnitude) at the cut-off angle frequency (=the shimmy occurrence frequency), the motor torque is further greatly corrected.

Further, in a case in which the vibration-suppression gain is outputted with the gain not being advanced, the correction of the motor torque by the vibration suppression torque generator 36 and the adder 33 is executed with the phase not being shifted. Consequently, a so-called rigidity in a control system is applied, so that a vibration having a relatively short cycle is suppressed surely and effectively by this rigidity.

Conversely, in a case in which the vibration-suppression gain is outputted with the gain being advanced (90° advanced, in particular), the correction of the motor torque by the vibration suppression torque generator 36 and the adder 33 is executed with the phase being shifted (90° shifted, in particular). Consequently, a so-called viscosity in the control system is applied, so that a vibration having a relatively long cycle is suppressed surely and effectively by this viscosity (viscosity application control).

That is, by variably matching the cur-off angle frequency of the vibration extracting filter 35 with various shimmy occurrence frequencies, there is provided the control device of the electric power steering which is capable of suppressing the tire shimmy. To sum up, in the shimmy occurrence frequency, the viscosity application control to apply the viscosity is performed by outputting the vibration-suppression gain outputted by gain adjuster 35*a* with the phase being 90° advanced.

Meanwhile, by fixedly matching the cut-off angle frequency ωc of the sub-frame resonance extracting filter 39 with the sub-frame resonance frequency, there is provided the electric power steering control device which is capable of suppressing the sub-frame resonance. To sum up, in the sub-frame resonance frequency, the viscosity application control to apply the viscosity is performed by outputting the vibration-suppression gain outputted by the sub-frame resonance extracting filter 39 with the phase being 90° advanced.

Hereafter, an operation of the present embodiment will be described.

The present embodiment provides the electric power steering control device which comprises the motor 20 to apply the assist torque to the steering device, the torque sensor 10 to detect the steering torque applied by the driver, the assist map 32 to set the motor torque to be outputted to the motor 20 based on the steering torque detected by the torque sensor 10, the motor angle sensor 12 to detect the rotational angle of the motor 20, the filter processor to output the vibration-suppression gain for suppressing the resonance of the sub frame 8, i.e., the sub-frame resonance-suppression gain, and the vibration-suppression gain for suppressing the shimmy of the vibration due to the tire rotation, i.e., the shimmy suppression gain, by performing the filter processing on the rotational angle of the motor 20 detected by the motor angle sensor 12, and the correcting mechanism (the vibration suppression torque generator 36, the adder 33) to correct the motor torque set by the assist map 32 by using the vibration-suppression gains outputted by the filter processor so as to suppress the resonance of the sub frame 8 and the shimmy.

Herein, the above-described filter processor comprises the sub-frame resonance extracting filter 39 which has the frequency characteristic that the gain becomes the peak (the maximum magnitude) and the phase advances by 90° at the cut-off angle frequency ωc which is fixedly set at the resonance frequency of the sub frame 8 and the shimmy extracting filter 35 which has the frequency characteristic that the gain becomes the peak (the maximum magnitude) and the phase advances by 90° at the cut-off angle frequency ωc which is variably set in accordance with the tire rotation frequency which is changeable according to the vehicle speed.

Further, the above-described filter processor further comprises the gain adder 40 which adds the gain of the sub-frame resonance extracting filter 39 and the gain of the shimmy extracting filter 35 and outputs the added magnitude to the correcting mechanism (i.e., the vibration suppression torque generator 36, the adder 33) as the vibration-suppression gain.

According to the present control device, the gain of the sub-frame resonance extracting filter 39 and the gain of the shimmy extracting filter 35 are added and outputted to the correcting mechanism (the vibration suppression torque generator 36, the adder 33).

In this case, since the cut-off angle frequency ωc is fixed at the resonance frequency of the sub frame 8 in the sub-frame resonance extracting filter 39, the resonance of the sub frame 8 is always suppressed stably by the torque correction based on the vibration-suppression gain.

Meanwhile, since the cut-off angle frequency ωc is variable in accordance with the tire rotation frequency in the shimmy extracting filter 35, even if the shimmy has occurred at any frequency, the shimmy is always suppressed by the correction based on the vibration-suppression gain. Accordingly, even if the vehicles have different frequencies of the shimmy depending on their individualities or the same vehicle experiences aged deterioration because of the aged deterioration of its suspension device 9 or the like, the shimmy can be properly suppressed. Further, since it is unnecessary to know the shimmy occurrence frequency in advance, suppressing of the shimmy can be achieved easily.

Moreover, since the phase of the vibration-suppression gain (the sub-frame resonance-suppression gain, the shimmy-suppression gain) advances by 90° in any case, the correction of the motor torque by the correcting mechanism (the vibration suppression torque generator 36, the adder 33) is executed with the phase being 90° shifted. Consequently, the viscosity is applied (viscosity application control), so that the resonance of the sub frame 8 and the shimmy are suppressed surely and effectively by this viscosity.

In the present embodiment, the above-described filter processor further comprises the first and second weighting adjusters 38*a*, 38*b* which weight the gain of the sub-frame resonance extracting filter 39 and the gain of the shimmy extracting filter 35, respectively, before adding of the gain of the sub-frame resonance extracting filter 39 and the gain of the shimmy extracting filter 35 by the gain adder 40.

According to this structure, by weighting the gains of the sub-frame resonance extracting filter 39 and the gain of the shimmy extracting filter 35, the shift amount from the phase of 90° at the cut-off angle frequency ωc is relatively small, compared with a case of no weighting. Accordingly, the viscosity application control is performed, so that the resonance of the sub frame 8 and the shimmy are always suppressed surely and effectively by the viscosity.

Figure 15:
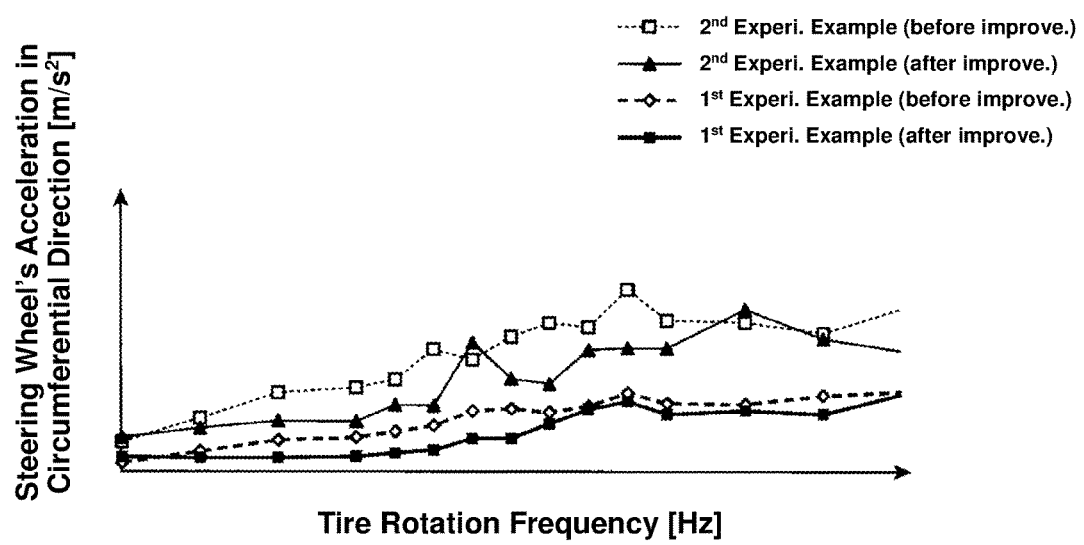
FIG. 15 is a graph showing respective occurrence states of sub-frame resonance and the shimmy before or after improvement in first and second experimental examples, respectively, which is for explaining an effect of the embodiment.

FIG. 15 is experimental data showing that it becomes difficult that the sub-frame resonance and the shimmy are transmitted to the steering wheel 1 before or after the above-described viscosity application control according to the present embodiment is performed (before or after improvement). A tire weight differs between first and second experimental examples, the tire weight of the first experimental example being lighter than that of the second experimental example. In any case, the vibration level is decreased over a substantially entire range of the tire rotation frequency by performing the viscosity application control of outputting the vibration-suppression gain with the phase being 90° advanced at the sub-frame resonance frequency and the shimmy occurrence frequency.

Herein the above-described embodiment shows the example in which the electric power steering is a column assist type, but the present invention is applicable to any type of electric power steering.

Further, while the output of the assist map is the motor torque in the above-described embodiment, the current to be applied to the motor is applicable instead.

Also, the low pass filter 31, the assist map 32, the adder 33, the current controller 34, the shimmy extracting filter 35, the gain adjustor 35a, the vibration suppression torque generator 36, the tire rotation frequency transfer 37, the first weighting adjuster 38a, the second weighting adjuster 38b, the sub-frame resonance extracting filter 39, and the gain adder 40 are included in the ECU 30 in the above-described embodiment, but the present invention should not be limited to this, of course.

Further, the above-described manner of correcting the motor torque by the adder 33 and the vibration suppression torque generator 36 is merely an example, and the present invention should not be limited to this, of course.

Moreover, the above-described various magnitudes of the present embodiment are also a merely example, and the present invention should not be limited to these, of course.

Additionally, the above-described viscosity application control is not limited to a case in which the vibration-suppression gain is outputted with the phase being 90° advanced at the sub-frame resonance frequency and the shimmy occurrence frequency. For example, even in a case in which the vibration-suppression gain is outputted with the phase being about 90° (including any angle within a specified range close to 90°) advanced at a specified frequency band including the sub-frame resonance frequency and the shimmy occurrence frequency (including any frequency within a specified range close to the sub-frame resonance frequency and the shimmy occurrence frequency).

What is claimed is:

1. An electric power steering control device, comprising:
a motor to apply an assist torque to a steering device;
a torque detector to detect a steering torque applied by a driver;
a setting mechanism to set a motor torque to be outputted to the motor based on the steering torque detected by the torque detector;
a rotational angle detector to detect a rotational angle of the motor;
a filter processor to output a vibration-suppression gain for suppressing resonance of a vehicle-body member and a vibration due to a tire rotation by performing a filter processing on the rotational angle of the motor detected by the rotational angle detector; and
a correcting mechanism to correct the motor torque set by the setting mechanism by using the vibration-suppression gain outputted by the filter processor so as to suppress resonance of the vehicle-body member and the vibration due to the tire rotation,
wherein said filter processor comprises a first filter which has a frequency characteristic that a gain becomes a specified magnitude and a phase advances by 90° at a cut-off angle frequency which is fixedly set at a resonance frequency of a specified vehicle body member,
a second filter which has another frequency characteristic that a gain becomes a specified magnitude and a phase advances by 90° at a cut-off angle frequency which is variably set in accordance with a tire rotation frequency which is changeable according to a vehicle speed, and
a gain adder which adds the gain of said first filter and the gain of said second filter and outputs an added magnitude to said correcting mechanism as said vibration-suppression gain outputted by the filter processor.

2. The electric power steering control device of claim 1, wherein said filter processor further comprises weighting adjusters which weight the gain of said first filter and the gain of said second filter, respectively, before adding of the gain of said first filter and the gain of said second filter by said gain adder.

* * * * *